United States Patent
Jang et al.

(10) Patent No.: US 9,378,891 B2
(45) Date of Patent: Jun. 28, 2016

(54) MULTILAYER CERAMIC DEVICE

(71) Applicant: SAMSUNG ELECTRO-MECHANICS CO., LTD., Suwon (KR)

(72) Inventors: Tae Jin Jang, Changwon (KR); Jin Hyung Lim, Hwasung (KR); Hae Sock Chung, Busan (KR); Doo Young Kim, Suwon (KR); Sang Hyun Park, Suwon (KR); Won Seh Lee, Seoul (KR)

(73) Assignee: SAMSUNG ELECTRO-MECHANICS CO., LTD., Suwon-Si, Gyeonggi-Do (KR)

( * ) Notice: Subject to any disclaimer, the term of this patent is extended or adjusted under 35 U.S.C. 154(b) by 229 days.

(21) Appl. No.: 14/104,301

(22) Filed: Dec. 12, 2013

(65) Prior Publication Data

US 2014/0160625 A1 Jun. 12, 2014

(30) Foreign Application Priority Data

Dec. 13, 2012 (KR) .......................... 10-2012-0145464

(51) Int. Cl.
| | |
|---|---|
| *H01G 4/30* | (2006.01) |
| *H01G 4/012* | (2006.01) |
| *H01G 4/232* | (2006.01) |
| *H01G 4/12* | (2006.01) |

(52) U.S. Cl.
CPC ................. *H01G 4/30* (2013.01); *H01G 4/012* (2013.01); *H01G 4/232* (2013.01); *H01G 4/12* (2013.01)

(58) Field of Classification Search
CPC .......... H01G 4/228; H01G 4/30; H01G 4/23; H01G 4/005; H01G 4/012; H01G 4/0085
USPC ........ 361/303, 304, 311, 301.4, 306.3, 301.2, 361/306.1, 321.1, 321.2
See application file for complete search history.

(56) References Cited

U.S. PATENT DOCUMENTS 4,513,350 A * 4/1985 Coleman ................ H01G 4/255
29/25.42

FOREIGN PATENT DOCUMENTS

| JP | 2002299149 A | * | 3/2001 | ............ H01G 4/12 |
| JP | 2013093374 A | * | 10/2011 | ............ H01G 4/232 |
| KR | 10-2005-0093879 | | 9/2005 | |
| KR | 20090032766 | * | 4/2009 | ............ H01G 4/12 |

* cited by examiner

*Primary Examiner* — Nguyen T Ha
(74) *Attorney, Agent, or Firm* — McDermott Will & Emery LLP

(57) ABSTRACT

Disclosed herein is a multilayer ceramic device including a device body having lateral surfaces and circumferential surfaces connecting the lateral surfaces, an internal electrode disposed in a length direction of the device body within the device body, an external electrode having a front portion covering the lateral surface and a band portion extending from the front portion to cover a portion of the circumferential surface, and a reinforcement pattern extending from the lateral surface toward the interior of the device body and having a length longer than a width of the band portion.

6 Claims, 5 Drawing Sheets

| CLASSIFICATION | EMBODIMENT 1 | COMPARATIVE EXAMPLE 1 | COMPARATIVE EXAMPLE 2 | COMPARATIVE EXAMPLE 3 |
|---|---|---|---|---|
| LENGTH CHANGE | BL < L1 < L2 < L3 | L1 < BL < L2 < L3 | L1 < L2 < BL < L3 | L1 < L2 < L3 < BL |
| SCHEMATIC VIEW |  |  |  |  |

| CLASSIFICATION | EMBODIMENT 2 | COMPARATIVE EXAMPLE 4 | COMPARATIVE EXAMPLE 5 |
|---|---|---|---|
| LENGTH CHANGE | BL < L1 < L4 | L1 < BL < L4 | L1 < L4 < BL |
| SCHEMATIC VIEW | | | |

MULTILAYER CERAMIC DEVICE

CROSS REFERENCE(S) TO RELATED APPLICATIONS

This application claims the benefit under 35 U.S.C. Section 119 of Korean Patent Application Serial No. 10-2012-0145464, entitled "Multilayer Ceramic Device" filed on Dec. 12, 2012, which is hereby incorporated by reference in its entirety into this application.

BACKGROUND OF THE INVENTION

1. Technical Field

The present invention relates to a multilayer ceramic device and, more particularly, to a multilayer ceramic device having a structure preventing generation of cracks.

2. Description of the Related Art

A chip component such as a general thin film type multilayer ceramic condenser (MLCC) includes a device body, an internal electrode, an external electrode, and the like. The device body is a laminate of a plurality of dielectric sheets known as so-called green sheets, and the internal electrode is provided on the dielectric sheet to form a single coil type circuit pattern within the device body. The external electrode is electrically connected to the internal electrode and covers both ends of an outer surface of the device body.

However, since a multilayer ceramic device is generally designed to be focused on improving device characteristics, its structure may be relatively vulnerable to external physical pressure or shock, thermal shock, vibrations, and the like. Thus, when physical or thermal shock is applied to the multilayer ceramic device, cracks are generated in the device body. In this case, cracks are generated, starting from a surface of the device body adjacent to an end portion of the external electrode and proceeding into the interior of the device body.

RELATED ART DOCUMENT (Patent Document) Korean Patent Laid Open Publication No. 10-2005-0093879

SUMMARY OF THE INVENTION

An object of the present invention is to provide a multilayer ceramic device having a structure capable of preventing a generation of cracks.

According to an embodiment of the present invention, there is provided a multilayer ceramic device including: a device body having lateral surfaces and circumferential surfaces connecting the lateral surfaces; an internal electrode disposed in a length direction of the device body within the device body; an external electrode having a front portion covering the lateral surface and a band portion extending from the front portion to cover a portion of the circumferential surface; and a reinforcement pattern extending from the lateral surface toward the interior of the device body and having a length longer than a width of the band portion.

The reinforcement pattern may be disposed to be coplanar with the internal electrode.

The internal electrode may include a floating electrode and a circuit pattern, and the reinforcement pattern may be disposed to be coplanar with the floating electrode.

A ratio between a width of the band portion and a length of the reinforcement pattern may be 1:1 to 1:3.1.

The reinforcement pattern may be disposed to be coplanar with the internal electrode and spaced apart from the internal electrode by a gap therebetween, and a length of the reinforcement pattern may be longer than a width of the gap.

The reinforcement pattern may be disposed to be coplanar with the internal electrode and spaced apart from the internal electrode by a gap therebetween, and a total length of the reinforcement pattern and the gap may be half or less of the device body.

The reinforcement pattern may be disposed to be coplanar with the internal electrode and spaced apart from the internal electrode by a gap therebetween, and the reinforcement pattern and the internal electrode may be formed through the same plating process.

DESCRIPTION OF THE PREFERRED EMBODIMENTS

Figure 1:
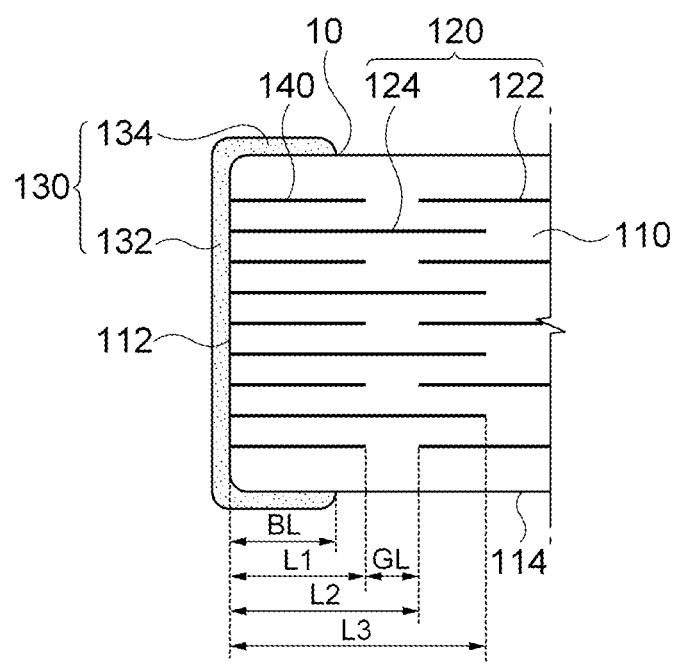
FIG. 1 is a cross-sectional view of a multilayer ceramic device according to an embodiment of the present invention.

Various advantages and features of the present invention and methods accomplishing thereof will become apparent from the following description of exemplary embodiments with reference to the accompanying drawings. However, the present invention may be modified in many different forms and it should not be limited to exemplary embodiments set forth herein. These exemplary embodiments may be provided so that this disclosure will be thorough and complete, and will fully convey the scope of the invention to those skilled in the art. Like reference numerals throughout the description denote like elements.

Terms used in the present specification are for explaining exemplary embodiments rather than limiting the present invention. Unless explicitly described to the contrary, a singular form includes a plural form in the present specification. The word "comprise" and variations such as "comprises" or "comprising," will be understood to imply the inclusion of stated constituents, steps, operations and/or elements but not the exclusion of any other constituents, steps, operations and/or elements.

Further, the exemplary embodiments described in the specification will be described with reference to cross-sectional views and/or plan views that are ideal exemplification figures. In drawings, the thickness of layers and regions is exaggerated for efficient description of technical contents. Therefore, exemplified forms may be changed by manufacturing technologies and/or tolerance. Therefore, the exemplary embodiments of the present invention are not limited to specific forms but may include the change in forms generated according to the manufacturing processes. For example, an etching region vertically shown may be rounded or may have a predetermined curvature. Therefore, the illustrated regions in the drawings have schematic attributes, and the shapes of the illustrated regions in the drawings are for illustrating specific shapes and are not for limiting the scope of the present invention.

Hereinafter, a multilayer ceramic device and a method for manufacturing the same according to embodiments of the present invention will be describe in detail with reference to the accompanying drawings.

FIG. 1 is a cross-sectional view of a multilayer ceramic device according to an embodiment of the present invention. Specifically, FIG. 1 is a view illustrating a floating mode cross-section of the multilayer ceramic device 100 according to an embodiment of the present invention.

Referring to FIG. 1, the multilayer ceramic device 100 according to an embodiment of the present invention may include a device body 110, an internal electrode 120, an external electrode 130, and a reinforcement pattern 140.

The device body 110 may have a multilayer structure in which a plurality of sheets is laminated. As the sheets, dielectric sheets known as so-called green sheets are used, and the laminate may substantially have a hexahedral shape. Thus, the device body 110 may have two lateral surfaces 112 and four circumferential surfaces 114 connecting the lateral surfaces 112.

The internal electrode 120 may be disposed to be substantially parallel to a length direction of the device body 110. The internal electrode 120 may include a floating pattern 122 as a metal pattern and a circuit pattern 124 formed on each of the sheets. Within the device body 110, the floating pattern 122 may not be in contact with the external electrode 130 and may be disposed between the lateral surfaces 112. The floating pattern 122 may be a dummy pattern and a non-circuit pattern not affecting capacitance characteristics of the multilayer ceramic device 100. The circuit pattern 124 may be a metal pattern in contact with the external electrode 130. The circuit pattern 124 may be formed on each of the sheets and may extend from the lateral surface 112 to the interior of the device body 110. The circuit pattern 124 formed on each sheet may form a single multilayer coil pattern within the device body 110.

The floating pattern 122 and the circuit pattern 124 may be alternately disposed in a thickness direction of the device body 110. In addition, the floating pattern 122 and the circuit pattern 124 may be disposed to have an interposed configuration in which end portions thereof are engaged with each other.

The external electrode 130 may cover both end portions of the device body 110. The external electrode 130 may have a front portion 132 and a band portion 134. The front portion 132 may cover the lateral surface 112 and the band portion 134 may extend from the front portion 132 to cover a portion of the circumferential surface 114. The band portion 134 may be a bonding portion for bonding the multilayer ceramic device 100 to an external device (not shown) such as a circuit board.

The reinforcement pattern 140 may serve to prevent a generation of cracks in the device body 110. The reinforcement pattern 140 is a non-circuit pattern not affecting capacitance characteristics of the device 100, which may extend from the lateral surface 112 to the interior of the device body 110. The reinforcement pattern 140 may be coplanar with the floating pattern 122 and may be disposed to be spaced apart from the floating pattern 122 by a predetermined gap therebetween.

Also, the reinforcement pattern 140 may be disposed to face a boundary portion 10, at which an end portion of the band portion 134 meets the device body 110, within the device body 10. Cracks generated due to physical and thermal shock applied to the device body 110 are generated in the boundary portion 10 and proceed to the interior of the device body 110. Thus, when the reinforcement pattern 140 is disposed to be substantially perpendicular to the progress path of cracks, an initial generation of cracks can be prevented, and if ever, the progress of cracks can be prevented.

In order to secure the crack preventing function as mentioned above, a length of the reinforcement pattern 140 (hereinafter, referred to as a 'reinforcement pattern length L1') may be substantially longer than a length of the band portion 134 (hereinafter, referred to as a 'band portion length L2'). If the reinforcement pattern length L1 is equal to or shorter than the band portion length L2, the reinforcement pattern 140 cannot sufficiently cover a movement path of cracks, having difficulty in exerting a crack preventing function. Meanwhile, if the reinforcement pattern length L1 is excessively long, an occupation area of the floating pattern 122 is reduced to degrade a function of the floating pattern 122 and a width of the gap is reduced to cause a problem such as interference, or the like. Also, the reinforcement pattern length L1 may be longer than a gap length GL. If the reinforcement pattern length L1 is shorter than the gap length GL, an occupation area of the floating pattern 122 may be increased, and since the reinforcement pattern length L1 is reduced, the reinforcement pattern length L1 may be shorter than the band length L2.

Also, the sum of the reinforcement pattern length L1 and the gap length GL may be half of the overall length of the device body 110. If the sum of the reinforcement pattern length L1 and the gap length GL exceeds half of the overall length of the device body 110, a space for the floating pattern 122 for implementing capacitance to be applied is eliminated, so the function of the multilayer ceramic body 100 as a capacitor may be lost.

Meanwhile, the band portion 134 is a portion for bonding the multilayer ceramic device 100 to an external device. As the area of the band portion 134 is increased, a bonding area with the external device is increased, enhancing bonding reliability between the multilayer ceramic body 100 and the external device. To this end, a band length BL may be increased, and in this case, the reinforcement pattern length L1 may also be increased proportionally. Preferably, a ratio between the band length BL and the reinforcement pattern length L1 may satisfy 1:1 or 1:3.1. If the ratio is less than 1:1, the reinforcement pattern 140 cannot cover a progress path of cracks, and if the ratio exceeds 1:3.1, the band length BL is relatively short over the overall length of the chip, degrading bond strength, or the like. In particular, in case that the multilayer ceramic device 100 is a multilayer capacitor, a minimum length of the band length BL of the band portion 134 may be approximately 30% to 34% of half of the device body 110. Thus, since a maximum length of the reinforcement pattern length L1 is half of the device body 110, a maximum length of the band length BL may be obtained by dividing 100% by 30% to 34%, which may be approximately 3.1. Namely, if the reinforcement pattern length L1 is longer by more than 3.1 times than the band length BL, the region of the band portion 134 is relatively narrowed, making it impossible to secure a minimum region of the band portion 134, and also, an occupation area of the reinforcement pattern length L1 is excessively increased to make it difficult to manifest a function as a capacitor.

Hereinafter, a desirable disposition and length of the reinforcement pattern 140 discussed above will be described in detail.

Figure 2:
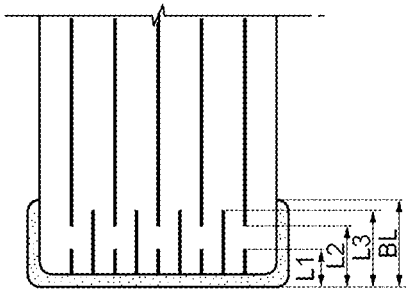
FIG. 2 is a view illustrating various types of multilayer ceramic device according to a change in a length of reinforcement pattern according to an embodiment of the present invention.
Figure 2:
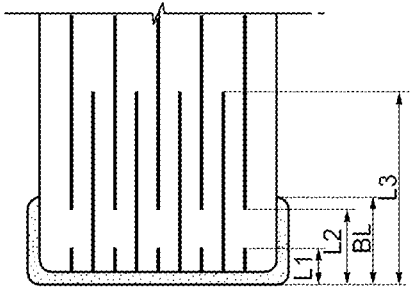
Figure 2:
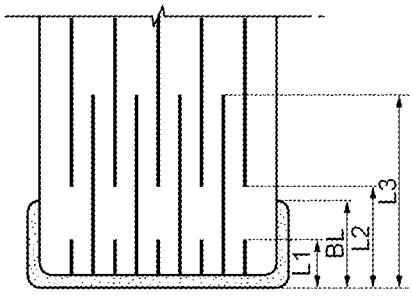
Figure 2:
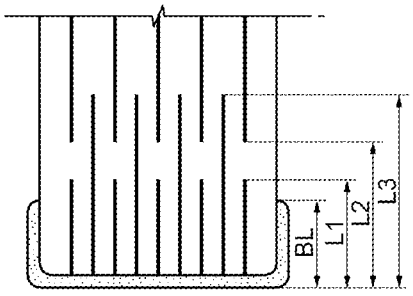
Figure 3:
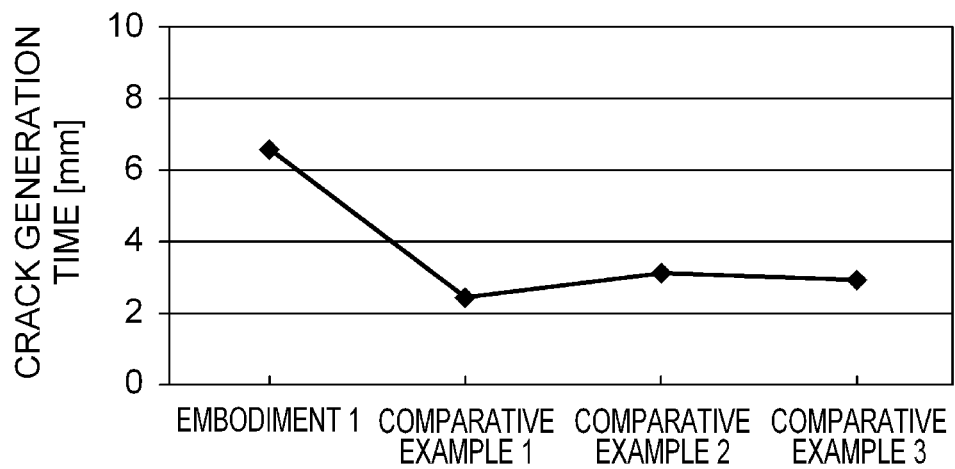
FIG. 3 is a graph showing degrees of warping of substrates when cracks are generated as the types of multilayer ceramic device illustrated in FIG. 2 are warped by 4 mm.
Figure 4:
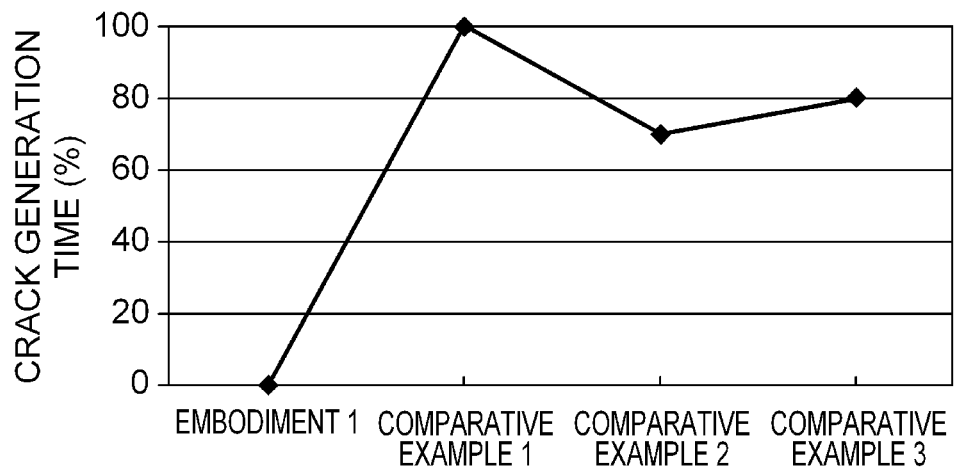
FIG. 4 is a graph showing a generation frequency of cracks when the types of multilayer ceramic device illustrated in FIG. 2 are warped.

FIG. 2 is a view illustrating various types of multilayer ceramic device according to a change in a length of reinforcement pattern according to an embodiment of the present invention. FIG. 3 is a graph showing degrees of warping of substrates when cracks are generated as the types of multilayer ceramic device illustrated in FIG. 2 are warped. FIG. 4 is a graph showing a generation frequency of cracks when the types of multilayer ceramic devices illustrated in FIG. 2 are warped by 4 mm.

Referring to FIG. 2, in order to ascertain the disposition, length, and the like, of a preferred reinforcement pattern of the multilayer ceramic device 100 described above with reference to FIG. 1, various types of devices structures according to embodiment 1, comparative example 1, comparative example 2, and comparative example 4 according to a change in the reinforcement pattern length L1 are illustrated. The examples are discriminated according to relative changes in the band length BL, the reinforcement pattern length L1, the circuit pattern length L2, and the length from the lateral surface 112 of the device body 110 to the floating pattern 122 (hereinafter, referred to as a 'length up to floating pattern', L3). Specific changes in the relative length of the examples are illustrated in a 'length change' item among times of the table of FIG. 2.

Referring to FIGS. 3 and 4, as in embodiment 1, when the reinforcement pattern length L1 is longer than the band length BL and shorter than the circuit pattern length L2 and the length L3 up to the floating pattern, it can be seen that strength of warping, i.e., a degree of warping of the device body 110, at the time when cracks are generated, is high, in comparison to the comparative examples 1 to 3, and in particular, when a substrate having a thickness of about 4 mm is warped, no crack was generated. Thus, the multilayer ceramic device according to an embodiment of the present invention includes a reinforcement pattern preventing a generation of cracks of the device body in the device body, and in this case, the reinforcement pattern length is formed to be longer than the length of the band portion of the external electrode to prevent a generation of cracks.

Hereinafter, a multilayer ceramic device according to another embodiment of the present invention will be described in detail. Here, the same content as that of the multilayer ceramic device 100 according to the former embodiment of the present invention as described above will be omitted or simplified.

Figures 5, 6:
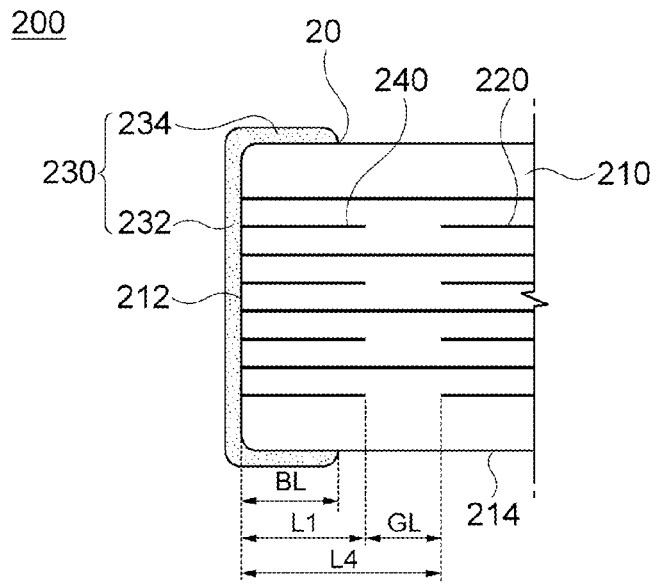
FIG. 5 is a cross-sectional view of a multilayer ceramic device according to another embodiment of the present invention.
FIG. 6 is a view illustrating various types of multilayer ceramic device according to a change in a length of reinforcement pattern according to an embodiment of the present invention.

FIG. 5 is a cross-sectional view of a multilayer ceramic device according to another embodiment of the present invention. Specifically, FIG. 5 is a view illustrating an open mode cross-section of a multilayer ceramic device 200 according to another embodiment of the present invention.

The multilayer ceramic device 200 may include a device body 210, an internal electrode 220, an external electrode 230, and a reinforcement pattern 240. The device body 210 is a laminate formed by laminating a plurality of sheets, substantially having a hexahedral shape. Thus, the device body 210 may have two lateral surfaces 212 and four circumferential surfaces 214 connecting the lateral surfaces 212.

The internal electrode 220 is a metal pattern disposed to be substantially parallel to a length direction of the device body 210. The internal electrode 120 may be a circuit pattern 122 contributing to formation of capacitance of the device 200. The internal electrode 220 may be disposed to be coplanar with the reinforcement pattern 240. A plurality of internal electrodes 220 may be disposed in a thickness direction of the device body 210.

The external electrode 230 may include a front portion 232 and a band portion 234 covering both end portions of the device body 210. The front portion 232 may cover the lateral surface 212 and the band portion 234 may extend from the front portion 232 to cover a portion of the circumferential surface 214.

The reinforcement pattern 240 may extend from the lateral surface 212 to the interior of the device body 210. The reinforcement pattern 240 may be coplanar with the internal electrode 220 and may be disposed to be spaced apart from the internal electrode 220 by a predetermined gap therebetween. The reinforcement pattern 240 may be disposed to face a boundary portion 20 where the device body 210 and an end of the band portion 234 meet.

A length of the reinforcement pattern 240 (hereinafter, referred to as a 'reinforcement pattern length L1') may be substantially longer than a length of the band portion 234 (hereinafter, referred to as a 'band portion length BL'). If the reinforcement pattern length L1 is equal to or shorter than the band portion length BL, the reinforcement pattern 140 cannot sufficiently cover a movement path of cracks, having difficulty in exerting a crack preventing function. Meanwhile, if the reinforcement pattern length L1 is excessively long, an occupation area of the internal electrode 220 is relatively reduced and a width of the gap is relatively narrowed to cause a problem such as interference, or the like. Also, the reinforcement pattern length L1 may be longer than a gap length GL.

Figure 7:
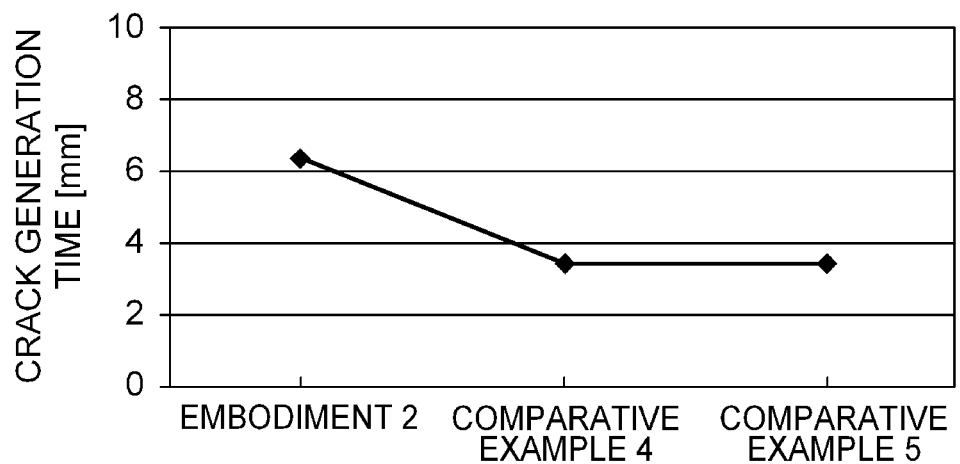
FIG. 7 is a graph showing degrees of warping of substrates when cracks are generated as the types of multilayer ceramic device illustrated in FIG. 6 are warped by 4 mm.
Figure 8:
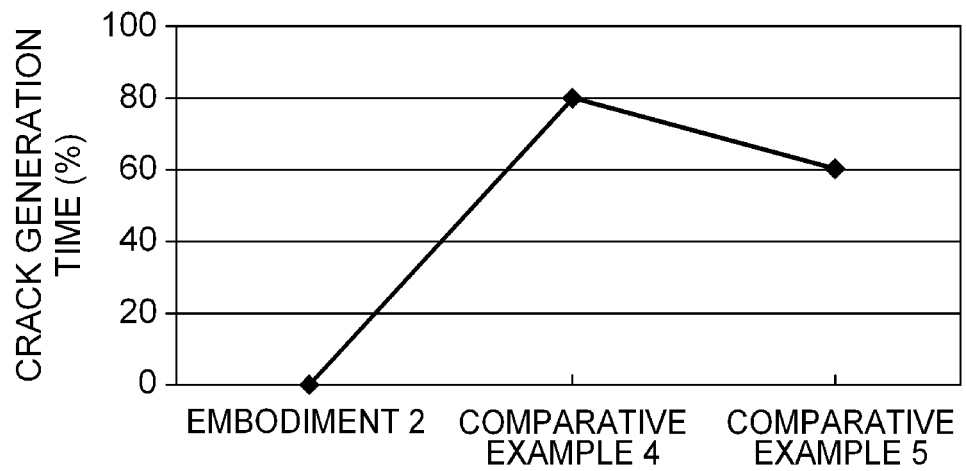
FIG. 8 is a graph showing a generation frequency of cracks when the types of multilayer ceramic device illustrated in FIG. 6 are warped.

FIG. 6 is a view illustrating various types of multilayer ceramic devices according to a change in a length of reinforcement pattern according to an embodiment of the present invention. FIG. 7 is a graph showing degrees of warping of substrates when cracks are generated as the types of multilayer ceramic device illustrated in FIG. 6 are warped by 4 mm. FIG. 8 is a graph showing a generation frequency of cracks when the types of multilayer ceramic device illustrated in FIG. 6 are warped.

Referring to FIG. 6, in order to ascertain the disposition, length, and the like, of a preferred reinforcement pattern of the multilayer ceramic device 100 described above with reference to FIG. 5, various types of device structures according to embodiment 2 of FIG. 2, comparative example 4, and comparative example 5 according to a change in the reinforcement pattern length L1 are illustrated. The examples are discriminated according to relative changes in the band length BL, the reinforcement pattern length L1, and the length from the lateral surface 212 of the device body 210 up to the internal electrode 220 (hereinafter, referred to as a 'length up to internal electrode', L4). Specific changes in the relative length of the examples are illustrated in a 'length change' item among times of the table of FIG. 6.

Referring to FIGS. 7 and 8, as in embodiment 2, when the reinforcement pattern length L1 is longer than the band length BL and the gap length GL and shorter than the length L4 up to the internal electrode, it can be seen that strength of warping, i.e., a degree of warping of the device body 110, at the time when cracks are generated, is high, in comparison to the comparative examples 4 and 5, and in particular, when a substrate having a thickness of about 4 mm is warped, no crack was generated. Thus, the multilayer ceramic device according to an embodiment of the present invention includes a reinforcement pattern preventing a generation of cracks of the device body in the device body, and in this case, the reinforcement pattern length is formed to be longer than the length of the band portion of the external electrode to prevent a generation of cracks.

According to the embodiments of the present invention, the multilayer ceramic device has the structure in which the reinforcement pattern for preventing a generation of cracks of the device body is provided in the device body and a length of the reinforcement pattern is longer than a length of the band portion of the external electrode, thus preventing a generation of cracks.

Although the preferred embodiments of the present invention have been disclosed for illustrative purposes, those skilled in the art will appreciate that various modifications, additions and substitutions are possible, without departing from the scope and spirit of the invention as disclosed in the accompanying claims. Accordingly, such modifications, additions and substitutions should also be understood to fall within the scope of the present invention.

What is claimed is:

1. A multilayer ceramic device comprising:
   a device body having lateral surfaces and circumferential surfaces connecting the lateral surfaces;
   an internal electrode disposed in a length direction of the device body within the device body, and including a floating electrode and a circuit pattern;
   an external electrode having a front portion covering the lateral surface and a band portion extending from the front portion to cover a portion of the circumferential surface; and
   a reinforcement pattern disposed to be coplanar with the floating electrode, extending from the lateral surface toward the interior of the device body,
   wherein a length of the reinforcement pattern is longer than a length of the band portion and shorter than a length from the lateral surface of the device body to the floating electrode, and
   the reinforcement pattern is disposed in at least one of upper and lower portions in a thickness direction of the device body.

2. The multilayer ceramic device according to claim 1, wherein the reinforcement pattern is disposed to be coplanar with the internal electrode.

3. The multilayer ceramic device according to claim 1, wherein a ratio between a width of the band portion and a length of the reinforcement pattern is 1:1.2 to 1:3.1.

4. The multilayer ceramic device according to claim 1, wherein the reinforcement pattern is disposed to be coplanar with the internal electrode and spaced apart from the internal electrode by a gap therebetween, and
   a length of the reinforcement pattern is longer than a width of the gap.

5. The multilayer ceramic device according to claim 1, wherein the reinforcement pattern is disposed to be coplanar with the internal electrode and spaced apart from the internal electrode by a gap therebetween, and
   a total length of the reinforcement pattern and the gap is half or less of the device body.

6. The multilayer ceramic device according to claim 1, wherein the reinforcement pattern is disposed to be coplanar with the internal electrode and spaced apart from the internal electrode by a gap therebetween, and
   the reinforcement pattern and the internal electrode are formed through the same plating process.

* * * * *